United States Patent [19]

Hardwick

[11] Patent Number: 5,259,547

[45] Date of Patent: Nov. 9, 1993

[54] METHOD OF MANUFACTURING BI-METALLIC TUBING

[75] Inventor: Roy Hardwick, Ayrshire, Scotland

[73] Assignee: Imperial Chemical Industries PLC, London, England

[21] Appl. No.: 911,656

[22] Filed: Jul. 13, 1992

[30] Foreign Application Priority Data

Jul. 12, 1991 [GB] United Kingdom ................ 9115106
Aug. 13, 1991 [GB] United Kingdom ................ 9117452

[51] Int. Cl.$^5$ ..................... B23K 20/08; B23K 31/00; B23K 20/04
[52] U.S. Cl. ................................. 228/107; 228/127; 228/139; 228/173.2
[58] Field of Search ............... 228/127, 128, 131, 107, 228/175, 139, 140, 173.2

[56] References Cited

U.S. PATENT DOCUMENTS

| 1,846,368 | 2/1932 | Smith | 228/139 |
| 4,162,758 | 7/1979 | Mikarai | 228/131 |
| 4,518,111 | 5/1985 | Hardwick | 228/107 |
| 4,795,078 | 1/1989 | Kuroki et al. | 228/131 |

FOREIGN PATENT DOCUMENTS

| 8600766 | 10/1987 | Netherlands | 228/107 |
| 1168265 | 10/1969 | United Kingdom. | |
| 1564779 | 4/1980 | United Kingdom. | |
| 2209978 | 6/1989 | United Kingdom. | |
| 2209979 | 6/1989 | United Kingdom. | |
| 2244226 | 11/1991 | United Kingdom. | |

Primary Examiner—Mark Rosenbaum
Assistant Examiner—Jeffrey T. Knapp
Attorney, Agent, or Firm—Cushman, Darby & Cushman

[57] ABSTRACT

This invention relates to a method for producing bi-metallic tubing wherein a layer (3,31) of a first metal is metallurgically bonded to the exterior surface of a core component (1,29) of a second metal incompatible for solid state bonding with the first metal by processes other than explosive bonding, the resulting cylindrical bonded composite (15,25) is placed within the bore of a thick-walled tube (33) of a metal compatible for solid state bonding with the first metal and the assembly (39) is heated and expanded by passing it over a profiled mandrel (43). In passing over the mandrel sufficient pressure is developed at the interface between the bonded composite and the thick-walled tube to form a metallurgical bond at the interface. When the first metal is the same as the metal of the thick-walled tube the interface is eliminated and a bi-metallic tube consisting of a single outer layer of the first metal with a bonded lining of the second metal is produced. The method is advantageous for producing large diameter tubes having an outer layer of cheaper metal for example, steel and a lining of more expensive metal corrosion-resistant metal, for example, nickel alloy.

13 Claims, 5 Drawing Sheets

METHOD OF MANUFACTURING BI-METALLIC TUBING

FIELD OF INVENTION

This invention relates to a method for producing bi-metallic tubing comprising an outer layer of a first metal metallurgically bonded to an inner layer of a second metal. The invention is specially useful for the manufacture of bi-metallic tubing wherein the inner wall of the tube is made from a corrosion resistant material.

BACKGROUND OF THE INVENTION

There is a considerable requirement for bi-metallic tubing, specifically for use in drill pipe and distribution pipeline in the oil and gas industries. Conventionally, such tubes consist of a principal metallic tube made from a first metal to which is bonded a metallic layer made from a second metal, the second metal being a more expensive corrosion-resistant material. The use of such tubing leads to reduction of costs by removing the need to manufacture corrosion resistant tubing which would be more expensive were it to consist entirely of the more expensive material and be made in a wall thickness which is sufficient to meet normal pressure requirements. The corrosion resistant layer will be on the inner surface of the tube through which the corrosive material passes.

Bi-metallic tubing is produced commercially by several methods including co-extrusion, centrifugal casting, co-drawing and internal weld overlaying, but co-extrusion is the predominant method of manufacture. The co-extrusion method consists of placing a first tube of corrosion resistant metal into the bore of a second and much thicker walled tube of less expensive metal, usually steel. The external diameter of the outer tube will be a close fit into the container of an extrusion press and will typically be some 300 mm to 400 mm. The internal bore will vary and be dependent upon the press mandrel being used to produce the specific bore for the extruded 'shell' to be formed. The length of the loose composite, i.e. first and second tubes, will be that required for the container of the extrusion press, and the proportional wall thickness of the two metallic tubes will be identical to that desired in the final tube to be produced. The interface of the tubes is sealed prior to heating the composite which is then extruded. On extrusion, the two metals become bonded at the interface.

Similarly, bonding of a loose composite of an inner and outer tube of dissimilar but compatible metals by heating and rolling the tubes over a mandrel to press the inner tube against the outer has been described in U.S. Pat. No. 4,162,758.

The principal limitation of these processes is that, to be successful, the two metals being used must be compatible for solid state bonding by these processes. For compatibility only small differences in the mechanical properties and atomic spacing of the two metals is tolerable. The choice of metals which can be used is therefore restricted.

An alternative method of producing the bi-metallic tubing is explosive bonding which is much less restricted and, because of the higher pressures involved, allows metal combinations with much more widely divergent mechanical properties and atomic spacing to be bonded. This method is implemented, for example, by placing a corrosion resistant tube within a steel tube and centralising the two tubes. The outside and inside diameters of the inner and outer tubes respectively are dimensioned such that, on centralising the two tubes, an annular gap exists between the tubes. In some cases, for metallurgical reasons such as, for example, migration of carbon from carbon steel to a corrosion resistant metal, a third tube of a different metal may be interposed between the inner and outer tubes with an annular gap between adjacent tubes. From this point the method continues via one of two methods, i.e. expansion or implosion.

The expansion method is described in UK Patent Nos. 2,209.978 and 2,209,979 and the implosion method is described in "A Fabrication Process for the Production of Zirconium Bimetal Tube for $Cl_2$ and $H_2S$ Gas Wells", by R Hardwick and C T Wang, in the Proceedings of The High Energy Rate Forming Conference, 1984, pp 189–194.

When bonding the expansion method an explosive charge is disposed within at least a portion of the bore of an inner tubular metal component to be expanded, and exploded to expand the inner component radially to collide and bond with the interior of the outer component.

In the implosion method an external annular explosive charge is disposed around the portion of tube to be imploded and fired. There are, however, limitations to both these methods of explosive bonding.

In the expansion method, for example, the inner tube bore defines the maximum volume of explosive which can be contained within it. If the wall thickness of the inner tube is sufficiently thick, a situation will arise where the tube bore cannot contain sufficient explosive to achieve bonding. This therefore defines a relationship between the tube bore, the wall thickness, and the material used.

Further, the outer tube wall thickness should be sufficiently thick if the outer tube itself is not to be expanded by the explosive charge. Should expansion of the outer tube occur, not only is dimensional control lost but the collision pressure occurring at the interface between the tubes is reduced, so leading to reduced bond quality. This problem may be overcome by use of an external die, as suggested in GB A 2,209,979. However this solution is time consuming, labour intensive and expensive.

A further disadvantage of the expansion method is that the detonation rate of the explosive is accelerated by the progressive increase in pressure within the tube bore. A situation may therefore occur where the detonation rate increases to a point beyond the upper limit for bonding. Consequently the length of tube together with the relative thicknesses of the inner and outer tubes which may be bonded by the expansion method is limited and is generally too short for practical requirements.

The method of implosion also suffers from a number of disadvantages. For example, the wall thickness of the outer tube being imploded is limited because of the requirement that, in order to ensure bonding, the interfacial annular gap should be a minimum of around 20% of the outer tube wall thickness. Thus if the outer wall is thick, the gap will be substantial and a situation will arise where the degree of contraction required of the outer tube is excessive. Surface wrinkling may, therefore, occur during contraction to depths which will not be removed by the bonding process, the avoidance of such wrinkling being essential to the explosive bonding process.

A further disadvantage of the implosion method previously used is that the upper limit of tube length which can practically be achieved is 3-4 meters. This is due to the difficulty in attaining a uniform explosive density along the length of the annular charge. Variations in explosive density may affect the detonation velocity and so cause the detonation front passing down the annular gap to be destabilised, and increasingly distorted as a function of distance. This continues until the associated collision front at the interface below the detonation front is no longer travelling exclusively in a longitudinal direction but also circumferentially in opposing directions. When these opposing fronts meet at a diametrically opposite point, adiabatic compression of air in front of the collision front causes excessive melting of the surface, preventing metal-to-metal bonding and also causing potential rupture of the inner tube. Consequently the implosion method limits the thickness of the outer tube and the length of the bi-metallic tube which can be produced.

Both the expansion and implosion methods are relatively expensive as they are extremely labour intensive. Further, the length limitations mean tube lengths are short, resulting in a high frequency of expensive prefabricated joints in the extended pipeline lengths which are usually required to be supplied for on-site installation. These methods have, therefore, hitherto found limited practical application and have only been used where technical quality requirements were of paramount importance.

In our co-pending United Kingdom patent application No. 9105651-5 a method for producing bi-metallic tubing which overcomes the abovementioned limitations is described. In this method the interior cylindrical surface of a tube of a first metal is explosively bonded to the exterior cylindrical surface of a substantially incompressible billet of a second metal by implosion of the tube of the first metal onto the substantially incompressible billet to form a cylindrical bonded composite. The composite is sub-divided and each of the several lengths of the cylindrical bonded composite is subsequently hot-extruded at an elevated temperature to form an extruded bi-metal shell of extended length. This shell is sub-divided into lengths, each of which is subsequently placed within the bore of a hollow billet of metal compatible with the first metal, so as to form an annular interface between exterior cylindrical surface of the shell and the interior cylindrical surface of the hollow billet. The annular interface is subsequently sealed so as to form an assembled composite, the composite then being co-extruded at an elevated temperature to form the required bi-metal tube. This method removes the limitations on the length of tube which can be produced and renders the whole production process commercially viable, the original high cost per unit length of the bonding process now having been reduced to a relatively small cost over the several extended lengths of the total final product.

The maximum diameter of tube which can be produced by this extrusion route is, however, limited by the diameter of the container of the available extrusion press and, in practice, it is unusual for tube diameters greater than 300 mm to be extruded.

SUMMARY OF THE INVENTION

An object of the present invention is to provide a method for producing metallurgically bonded bi-metallic tubing which facilitates the manufacture of large diameter seamless tubes.

In accordance with the present invention a method for producing a bi-metal tube comprises the steps of metallurgically bonding a layer of a first metal to the exterior surface of a core component of a second metal (optionally having an axial bore) to form a cylindrical bonded composite, said first and second metals being incompatible for solid state bonding by processes other than explosive bonding; placing at least a length of the said cylindrical bonded composite within the bore of a thick-walled tube of a metal compatible for solid state bonding with the first metal so as to form an annular interface between the exterior surface of the cylindrical bonded composite and the interior surface of the said thick-walled tube; sealing the annular interface so as to form an assembled composite; heating the assembled composite to an elevated temperature at which solid state bonding of the thick-walled tube and the first metal may be effected; and passing the hot assembled composite over a profiled mandrel whereby an axial bore is formed and/or expanded in the said core component, the wall thicknesses of the cylindrical bonded composite and the thick-walled tube are progressively reduced and sufficient pressure is developed at the interface to effect metallurgical bonding between the said cylindrical bonded composite and the thick-walled tube.

The metallurgical bonding of the layer of first metal to the core component may be effected by any convenient bonding process. For example, some metal combinations may conveniently be bonded by electroplating or, in cases where the metals are compatible for welding in the molten state (although not compatible for solid state bonding), the second metal may be applied to the first metal by fusion welding. However the method generally preferred is explosive welding wherein a tube of the first metal is imploded by means of an explosive charge against the core component to bond the interior surface of the tube to the exterior surface of the core component. This explosive bonding method gives superior bond strength and is applicable to almost all combinations of first and second metal without being unduly restricted by compatibility requirements.

The core component of second metal may be a solid cylinder, in which case it is axially pierced by the mandrel or it may be of hollow tubular form having for example, an axial bore, provided the wall is sufficiently thick to prevent substantial compression in the explosive bonding step (implosion). Thinner walled tube may be used if the wall is supported internally by filling the tubular core with a liquid.

The interface between the bonded composite and the thick-walled tube is sealed, for example by fusion welding to prevent oxidation at the interface during heating.

When the core component has an axial bore the interface may be conveniently and effectively sealed by firing a linear explosive charge within the bore to expand the bonded composite into intimate sealed contact with the thick-walled tube. If desired, for optimum sealing the interface may additionally be fusion-welded at the ends.

In practice it is advantageous, in the assembled composite, to connect the cylindrical bonded composite to the thick-walled tube by connecting means sufficiently strong to preclude substantial differential rotation therebetween when the assembled composite is passed over the profiled mandrel. The connecting means may be provided by a strong fusion-weld but a superior connecting means comprises one or more connecting pins which may advantageously be inserted into corresponding axially drilled holes centered on the interface to provide one or more keys between the bonded composite and the thick-walled tube. The holes are parallel to the axis of assembled composite.

The assembled composite is preferably forced over the profiled mandrel by means of externally placed barrel rollers which continuously rotate and advance the assembled composite in the space between the rollers and the profiled mandrel. In this operation, the core component of the bonded composite is pierced by the mandrel to form an axial bore or any pre-existing bore is expanded and the wall thickness of the bonded composite and the thick-walled tube is simultaneously decreased. High local pressure is established at the interface of the bonded composite and the thick-walled tube by the barrel rollers and mandrel which causes the outer first metal layer of the bonded composite to become metallurgically bonded to the thick-walled tube at the interface. When the first metal is the same as the metal of the thick-walled tube the method of the invention produces a bi-metal tube consisting of a single outer substrate of the first metal with a metallurgically bonded inner lining (or clad) of the second metal.

The bi-metallic tube produced by the method of the present invention can be subsequently processed in any conventional manner for example by further expansion steps or reduction by drawing, pilgering or stretch-forming.

In cases when the desired length of the cylindrical bonded composite is greater than the practical limit for explosive bonding, a larger diameter bonded composite of a maximum practicable length may be bonded at a diameter appropriate for accommodation in an extrusion press. This length can be sub-divided into lengths appropriate for the extrusion press and each sub-divided length may be hot-extruded to provide an elongated length of cylindrical bonded composite. Alternatively, when the bonded composite has a diameter rendering it capable of hot-expansion, and a metal cross-section sufficiently small to be within the power capacity of a hot expansion rotary piercer, the bonded composite may be hot-expanded and elongated by forcing it over a rotary piercer by pressure rolls. The bonded composite may be solid but preferably it has an axial bore and the wall-thickness is reduced and the composite is elongated simultaneously during the hot-expansion. The elongated bonded composite may be subdivided into lengths suitable for bonding subsequently to a thick-walled tube. These extended lengths of bonded composite or subdivided portions thereof produced either by hot-extrusion or hot-expansion may be placed within the bore of an equal length of thick-walled tube, the interface sealed and the assembled composite heated and hot-worked as described above to bond the cylindrical bonded composite and the thick-walled tube.

The first metal and the metal for the thick-walled tube may conveniently be steel and the second metal may advantageously be a more expensive corrosion resistant metal or alloy for example, nickel, titanium, zirconium or a corrosion resistant alloy of any of these metals.

In some cases the first metal may advantageously be steel of lower carbon content than that of the thick-walled tube in order to limit migration of carbon from the thick-walled tube to the corrosion resistant metal which could adversely affect the corrosion resistance. The thickness of the lower carbon content steel should not, however, be sufficient to have a significant effect on the overall strength of the bi-metallic tube.

BRIEF DESCRIPTION OF THE DRAWINGS

The invention will now be described by way of example only, with reference to the accompanying drawings in which.

DETAILED DESCRIPTION

Figure 1A:
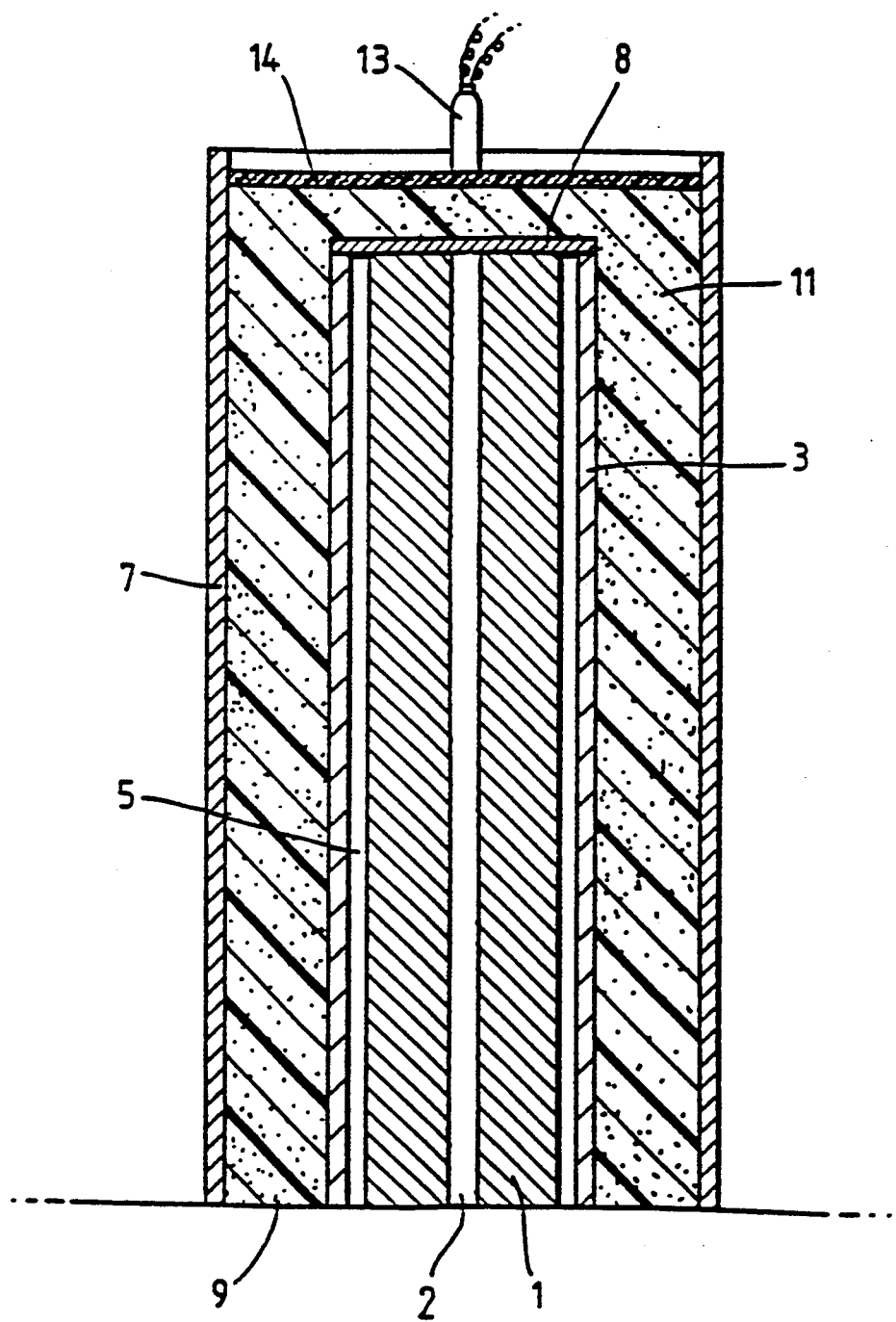
FIGS. 1a and 1b show two side, cross-sectional views of arrangements of different dimensions of core component for use in performing a first step of a method according to the present invention, prior to implosion.
Figure 1B:
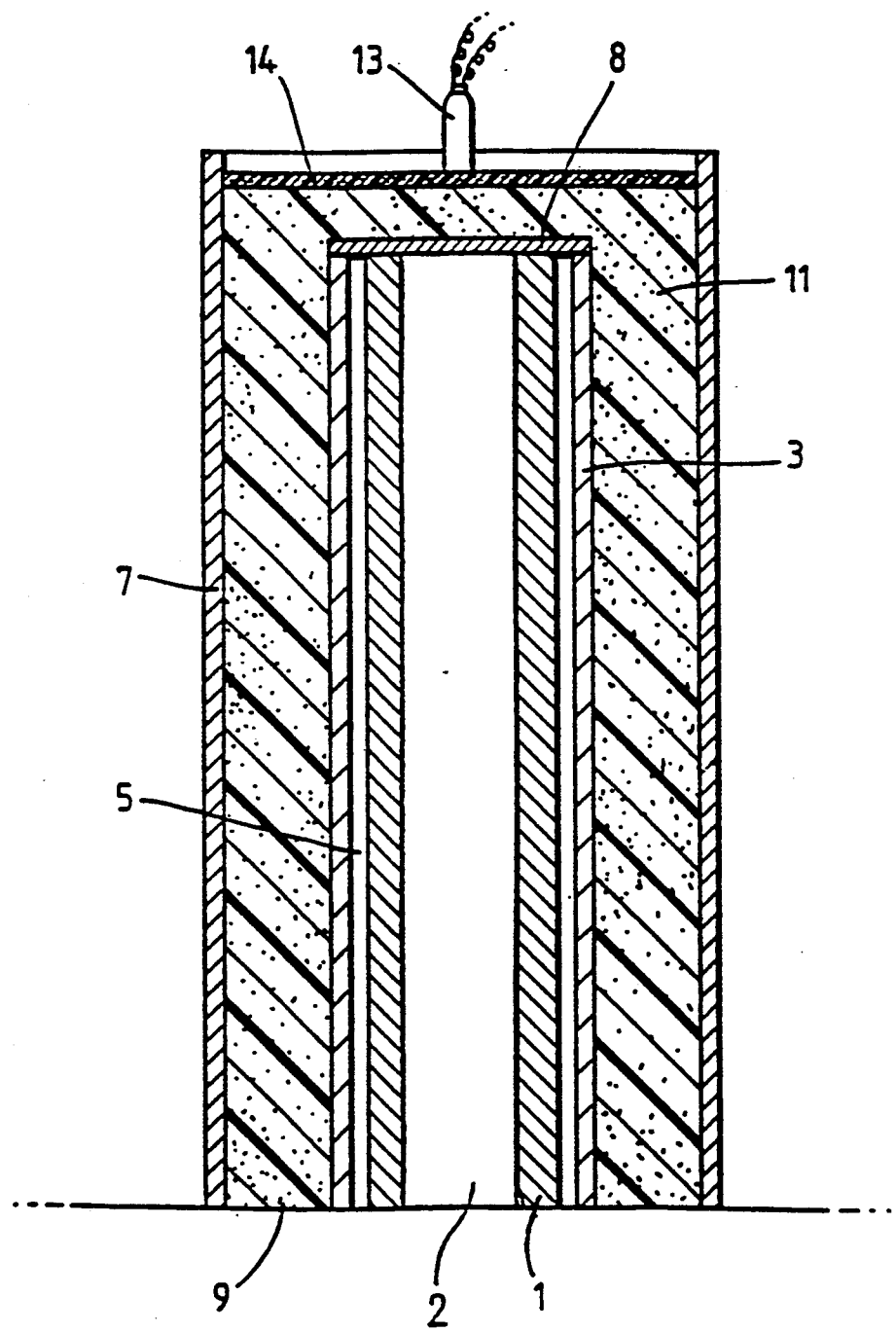

Referring to FIG. 1a and 1b, a tube 1 of corrosion resistant metal, e.g. nickel alloy, having an axial bore 2 (which may contain internal supporting means) is placed in a vertical position. A steel tube 3 is placed over, and concentric with, the tube 1, so as to form an annular gap 5 between the tube 1 and the tube 3. A cardboard or plastic tube is placed concentrically around the steel tube 3 so as to form a second annular gap 9 between the steel tube 3 and tube 7. A metal disc 8 is placed on the top of the steel tube 3 so as to close the annular gap 5. The second annular gap 9 is then filled with explosive 11 so as to form a column of explosive covering the sides and top of the tube 3, and a disc 14 of plastic explosive is placed over the upper end of the column of explosive 11.

The explosive 11 can be initiated by a detonator 13 positioned on the upper surface of the disc 14. On detonation a collision front, between the outer surface of the tube 1 and the inner surface of the steel tube 3, will form and travel downwards to close the annular gap 5 so as to form an explosively bonded composite from the tube 1 and steel tube 3 as the detonation front passes down the length of the explosive 11.

In a typical arrangement for FIG. 1a which is intended for preparing a bonded composite which is to be sub-divided and extruded (cf FIG. 2) before insertion into a thick-walled tube, typical dimensions may be as follows. The tube 1 may have an outer diameter of 11" to 17" (280 mm–430 mm), and a bore of 3"–7" (75 mm to 175 mm). The steel tube 3 may have a thickness of around 0.5"–0.625" (12.5 mm–16 mm), the annular gap 5 (i.e. stand-off distance) may be around 0.375″ (10 mm) and the length of the tube 1 and steel tube 3 may be around 118″ (3000 mm). After detonation of the explosive 11, the resulting bonded composite is suitable for sub-division into extrusion 'blooms' of around 24″ (610 mm) length.

In the arrangement of FIG. 1b, which is intended for the preparation of a bonded composite suitable for direct insertion into a thick-walled tube prior to hot expansion (cf FIG. 3), the explosive bonding step would be the same as for the arrangement of FIG. 1a but tube 1 may require internal support. Typical dimensions may be as follows: tube 1 may have an outer diameter around 3″–7″ (75 mm–175 mm) and wall thickness of 0.375″ to 1.5″ (10 mm–38 mm); the steel tube 3 may have a wall thickness of 0.375″ to 0.625″ (10 mm–16 mm); the annular gap 5 may be around 0.25–0.375″ (6 mm–10 mm); and the length of the inner tube 1 and tube 3 may be around 118″ (3000 mm). The explosive column 11, in both FIGS. 1a and 1b, will have an explosive mass to metal mass ratio as appropriate for the dimensions and the metal combination to be bonded, as will be known to those skilled in the art.

Figure 2:
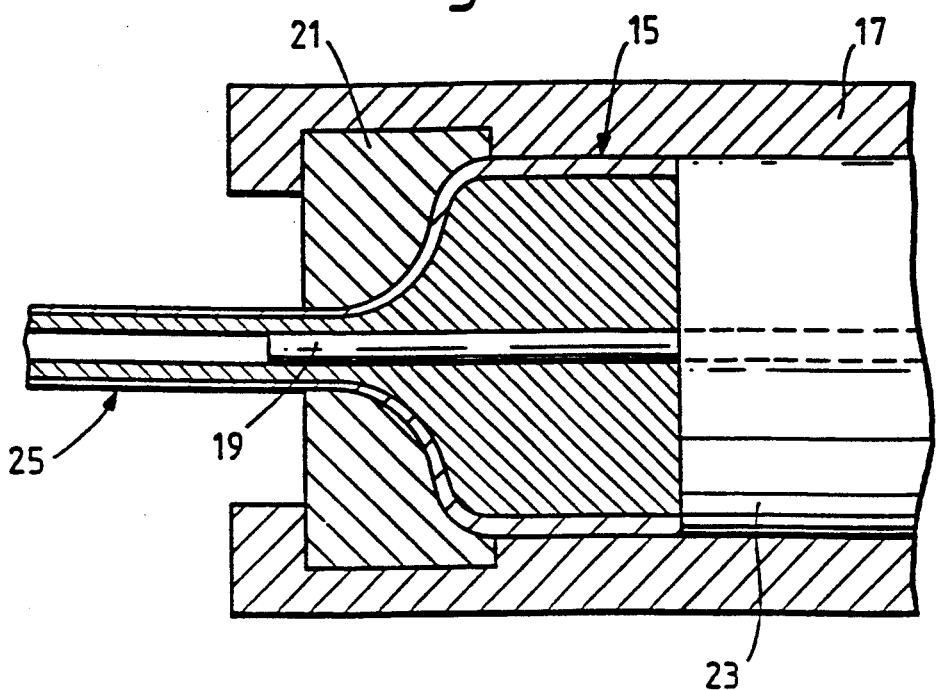
FIG. 2 - is a side cross-sectional view of a length of a cylindrical bonded composite formed in the arrangement of FIG. 1a being hot-extruded in accordance with a further optional step of the method of the present invention.

Referring to FIG. 2, a portion 15 of the sub-divided bonded composite (from FIG. 1a) is placed in a container 17 of an extrusion press (not fully shown), and a mandrel 19 is then passed through the composite portion 15 and located concentrically in an extrusion die 21, whereupon pressure is applied to the composite 15 by a ram 23, forcing the composite portion 15 between the mandrel 19 and die 21 to emerge as extruded bonded composite 25 of reduced diameter. The extruded bonded composite 25 may then be cut and/or trimmed to an appropriate length for insertion into a thick-walled tube (33) of equal length.

Figure 3:
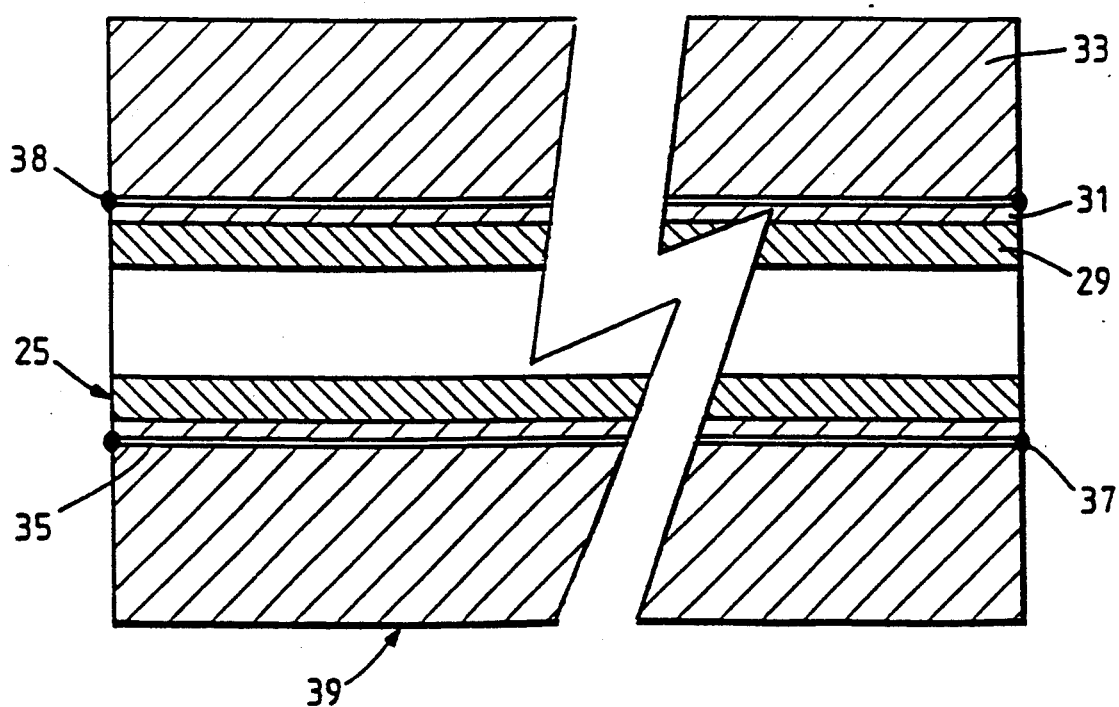
FIG. 3 - is a side fragmented cross-sectional view of an assembled composite comprising a length of the extruded bonded composite shown in FIG. 2 (or a length of bonded composite formed in the arrangement of FIG. 1b)

Referring to FIG. 3, a bonded composite 25 produced in the arrangement of FIG. 1b or from the extrusion step shown in FIG. 2 and consisting of an inner liner 29 of corrosion resistant metal which is bonded to a steel layer 31, is placed within the bore of a thick-walled tube 33 of metal so as to form an interface 35 between the layer 31 and the tube 33.

The tube 33 is made of a metal which is either identical to, or compatible for solid state bonding with the outer layer 31 of the bonded composite 25. The interface 35 is sealed by fusion welds 37, 38 at each end so as to form a loose assembled composite 39. The fusion welds 37, 38 prevent oxidation of the metal surfaces at the interface 35 during subsequent heating of the loose assembled composite 39, and are sufficiently strong to prevent relative rotation between composite 25 and the thick-walled tube 33.

Figure 4:
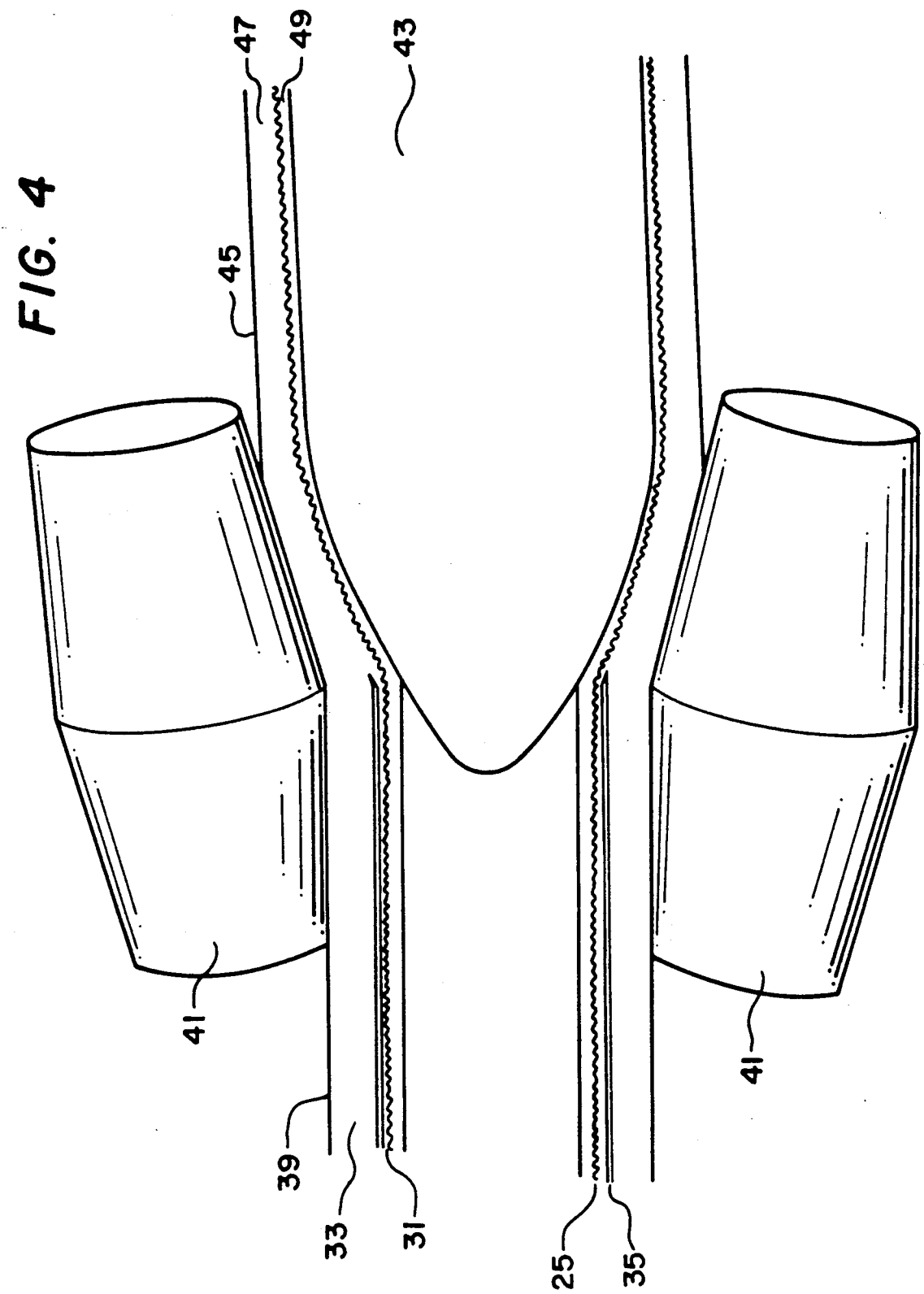
FIG. 4 - is a side view, partly in cross-section, of a length of the assembled composite of FIG. 3 being expanded to form a bi-metal tube in accordance with a final step of the method of the present invention.
Figure 5:
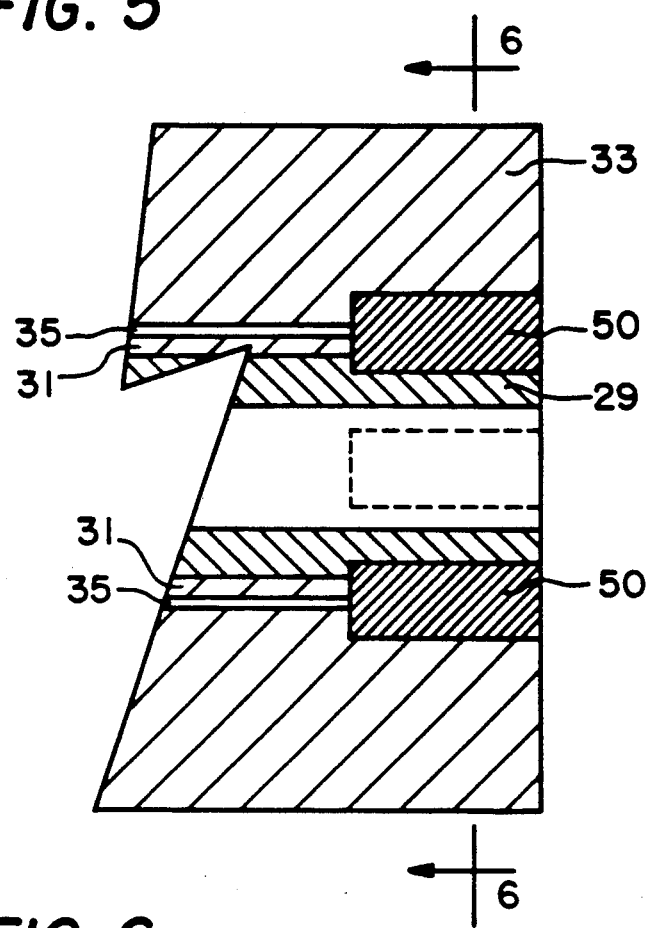
FIG. 5 is a side fragmented cross-sectional view of the leading end portion of the assembled composite of FIG. 3, with axial keying pins.
Figure 6:
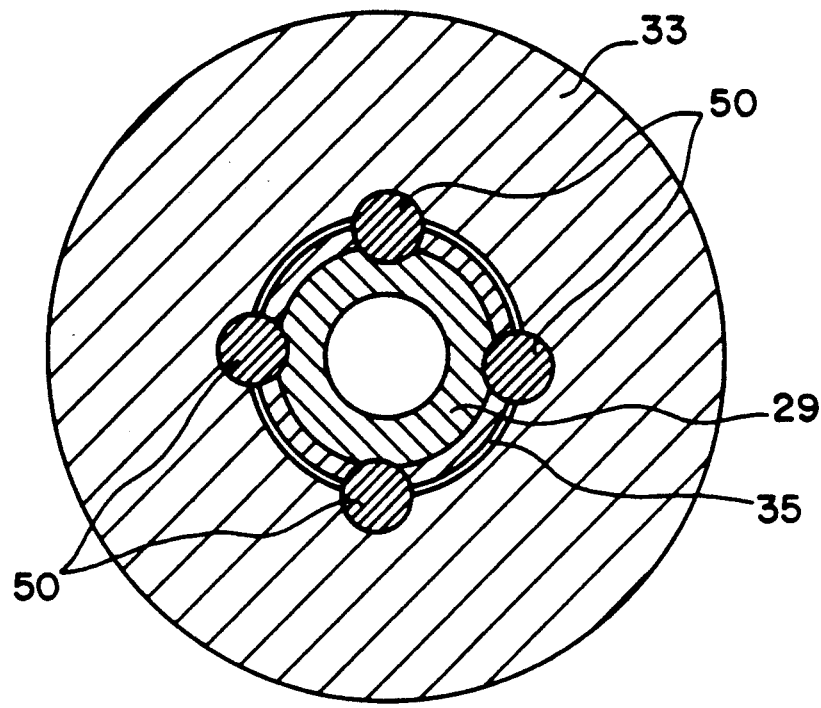
FIG. 6 is a cross-section on the line 6—6 of FIG. 5.

Referring to FIG. 4, the loose assembled composite 39 is heated and then rotated and traversed between two outer barrel rollers 41 and is thereby forced over a profiled mandrel 43, to expand the bore diameter of the composite 39. Simultaneously, the pressure exerted between the barrel rollers 41, and the mandrel 43, forms a metallurgical bond between the internal surface of the thick-walled tube 33, and the external surface of the bonded composite 25 thereby eliminating the interface 35. The resulting composite bi-metallic tube 45 consists of a single substrate outer layer 47, and an inner cladding layer 49 of corrosion resistant metal. Referring to FIGS. 5 and 6, if necessary the composite 25 and the thick-walled tube 33 may be connected by keying pins 50 located in holes drilled parallel to the axis of the assembled composite 39 and located on the interface 35 at least at the leading end of the assembled composite 39 which engages the mandrel first.

In a modified procedure not involving implosion of the tube 3 against the tubular core 1, an overlay of metal 3 such as carbon steel is strip-welded to a tube 1 of a metal such as a nickel alloy which is compatible with metal 3 for fusion welding in the molten state although incompatible therewith for solid state bonding by processes other than explsive bonding. The bonded composite 15 thus produced may be further processed by the procedure described above and illustrated in FIGS. 2–4 to produce the required bi-metallic tube 45.

I claim:

1. A method for producing a bi-metallic tube comprising the steps of:
   providing a layer of a first metal;
   providing a core component of a second metal, said second metal being incompatible for solid state bonding with said first metal by processes other than explosive bonding;
   metallurgically bonding said layer of said first metal to an exterior surface of said core component and thereby forming a cylindrical bonded composite;
   placing at least a portion of said cylindrical bonded composite within a bore of a thick-walled tube of a metal compatible for solid state bonding with said first metal and thus forming an annular interface between an exterior surface of said thick-walled tube;
   sealing said annular interface and thereby forming an assembled composite;
   heating said assembled composite to an elevated temperature at which solid state bonding of said thick-walled tube and said first metal can be effected; and
   forcing said assembled composite at said elevated temperature axially over a mandrel of progressively increasing diameter by means of two or more externally placed barrel rollers whereby said assembled composite is continuously rotated and advanced helically in a space between said rollers and said mandrel, an axial bore is provided in said core component by at least one of forming an axial bore in a solid core component and expanding a preformed axial bore in said core component, the wall thicknesses of said cylindrical bonded composite and said thick-walled tube are simultaneously and progressively reduced and sufficient pressure is developed at said interface to effect metallurgical bonding between said cylindrical bonded composite and said thick-walled tube and thus form said bi-metallic tube.

2. A method as claimed in claim 1 wherein the step of metallurgical bonding of the said layer of first metal to the said core component of the second metal is effected by a method selected from the group consisting of electroplating, fusion welding and implosion.

3. A method as claimed in claim 1 wherein the step of sealing the annular interface comprises fusion welding.

4. A method as claimed in claim 1 wherein the said core component has an axial bore and the step of sealing the interface includes the firing of a linear explosive charge within the bore whereby the bonded composite is expanded into intimate sealed contact with the thick-walled tube.

5. A method as claimed in claim 1, said method additionally comprising the step of connecting the cylindrical bonded composite to the thick-walled tube by connecting means sufficiently strong to preclude substantial differential rotation between the said bonded composite and the said thick-walled tube when the assembled composite is passed over the mandrel.

6. A method as claimed in claim 5 wherein the connecting means comprises one or more connecting pins.

7. A method as claimed in claim 1, said method additionally comprising the step of providing an elongated length of the said cylindrical bonded composite by a process selected from the group consisting of hot-extrusion and hot-expansion, at least a portion of said extended length being placed within the bore of an equal length of thick-walled tube and sealed to form the said assembled composite.

8. A method as claimed in claim 1 wherein the said first metal is the same as the metal of the thick-walled tube.

9. A method as claimed in claim 8 wherein the said first metal is steel.

10. A method as claimed in claim 1 wherein the second metal is a corrosion resistant metal or alloy.

11. A method as claimed in claim 10 wherein the second metal is a nickel alloy and the first metal is steel.

12. A method as claimed in claim 1, wherein said thick-walled tube is carbon steel and said first metal is carbon steel having a lower carbon content than that of said thick-walled tube to limit migration of carbon from said thick-walled tube to said second metal.

13. A method for producing a bi-metallic tube comprising the steps of:
 providing a layer of a first metal;
 providing a core component of a second metal, said second metal being incompatible for solid state bonding with said first metal by processes other than explosive bonding;
 metallurgically bonding said layer of said first metal to an exterior surface of said core component and thereby forming a cylindrical bonded composite;
 placing at least a portion of said cylindrical bonded composite within a bore of a thick-walled tube of a metal compatible for solid state bonding with said first metal and thus forming an annular interface between an exterior surface of said thick-walled tube;
 connecting said cylindrical bonded composite to said thick-walled tube by connecting means comprising one or more connecting pins, each pin being inserted into a hole drilled along an axis located on said interface and parallel to the axis of said cylindrical bonded composite, said pins being effective to provide one or more keys between said bonded composite and said thick-walled tube;
 sealing said annular interface and whereby forming an assembled composite;
 heating said assembled composite to an elevated temperature at which solid state bonding of said thick-walled tube and said first metal can be effected; and
 forcing said assembled composite at said elevated temperature axially over a mandrel of progressively increasing diameter by means of two or more externally placed barrel rollers whereby said assembled composite is continuously rotated and advanced helically in a space between said rollers and said mandrel, an axial bore is provided in said core component by at least one of forming an axial bore in a solid core component and expanding a preformed axial bore in said core component, the wall thicknesses of said cylindrical bonded composite and said thick-walled tube are simultaneously and progressively reduced and sufficient pressure is developed at said interface to effect metallurgical bonding between said cylindrical bonded composite and said thick-walled tube and thus form said bi-metallic tube, wherein said connecting means is sufficiently strong to preclude substantial differential rotation between said bonded composite and said thick-walled tube when said assembled composite is forced over said mandrel.

* * * * *